United States Patent
Mellqvist et al.

(10) Patent No.: US 9,848,325 B2
(45) Date of Patent: Dec. 19, 2017

(54) ENABLING SECURE APPLICATION DISTRIBUTION ON A (E)UICC USING SHORT DISTANCE COMMUNICATION TECHNIQUES

(71) Applicant: Sony Corporation, Tokyo (JP)

(72) Inventors: Anders Mellqvist, Malmo (SE); David Berthet, Akarp (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/531,399

(22) Filed: Nov. 3, 2014

(65) Prior Publication Data

US 2016/0014601 A1  Jan. 14, 2016

(30) Foreign Application Priority Data

Jul. 14, 2014  (EP) .................................. 14176921

(51) Int. Cl.
*H04M 1/66* (2006.01)
*H04W 12/06* (2009.01)
(Continued)

(52) U.S. Cl.
CPC ........... *H04W 12/06* (2013.01); *H04W 4/008* (2013.01); *H04W 8/205* (2013.01)

(58) Field of Classification Search
CPC ..... H04W 12/04; H04W 4/001; H04W 4/003; H04W 8/265; H04W 12/06; H04W 8/205;
(Continued)

(56) References Cited

U.S. PATENT DOCUMENTS 6,580,356 B1  6/2003  Alt et al.
7,202,773 B1  4/2007  Oba et al.
(Continued)

FOREIGN PATENT DOCUMENTS

EP   2018038   1/2009
EP   2378748   10/2011
(Continued)

OTHER PUBLICATIONS

Bionym, "The Nymi White Paper", Nov. 19, 2013.
International Search Report for corresponding international application PCT/IB2015/054611, dated Sep. 30, 2015.

*Primary Examiner* — Keith Fang
*Assistant Examiner* — B. M. M Hannan
(74) *Attorney, Agent, or Firm* — Renner, Otto, Boisselle & Sklar, LLP

(57) ABSTRACT

The present disclosure provides for methods and devices for enabling distribution of a first security application comprised in the first wireless device to the second wireless device. One method comprises the steps of receiving, in the first wireless device, using a short distance communication technology, a hardware identifier of the second wireless device, sending, from the first wireless device, the hardware identifier and information identifying the first security application to the network node, receiving, in the network node, from the first wireless device, the hardware identifier of the second wireless device and the information identifying the security application and authorizing, in the network node, the second wireless device to receive and/or activate a second security application associated with the first security application of the first wireless device.

33 Claims, 7 Drawing Sheets

(51) Int. Cl.
*H04W 4/00* (2009.01)
*H04W 8/20* (2009.01)

(58) Field of Classification Search
CPC ... H04L 63/0492; H04L 63/061; H04L 63/08; H04L 63/0892; H04L 63/102
USPC .............................................. 235/375; 726/4
See application file for complete search history.

(56) References Cited

U.S. PATENT DOCUMENTS

| | | | | |
|---|---|---|---|---|
| 8,099,789 | B2 * | 1/2012 | Challener | H04L 9/3236 726/27 |
| 8,769,610 | B1 * | 7/2014 | Giguiere | H04L 63/20 726/1 |
| 2003/0033209 | A1 * | 2/2003 | Minear | G06Q 30/02 705/26.1 |
| 2003/0143990 | A1 * | 7/2003 | Minear | H04M 1/72525 455/418 |
| 2004/0023689 | A1 * | 2/2004 | Ahonen | H04W 12/04 455/558 |
| 2005/0008148 | A1 | 1/2005 | Jacobson | |
| 2005/0079859 | A1 * | 4/2005 | Eakin | H04L 69/329 455/411 |
| 2005/0080906 | A1 * | 4/2005 | Pedersen | H04L 63/08 709/228 |
| 2005/0243061 | A1 | 11/2005 | Liberty et al. | |
| 2007/0145119 | A1 | 6/2007 | Rhelimi | |
| 2007/0282783 | A1 | 12/2007 | Singh | |
| 2008/0229304 | A1 * | 9/2008 | Bengtsson | G06F 8/61 717/178 |
| 2009/0037207 | A1 * | 2/2009 | Farah | G06Q 10/103 705/301 |
| 2009/0094681 | A1 | 4/2009 | Sadler et al. | |
| 2009/0217348 | A1 * | 8/2009 | Salmela | H04L 63/08 726/2 |
| 2010/0277435 | A1 | 11/2010 | Han et al. | |
| 2011/0136470 | A1 | 6/2011 | Kurz | |
| 2011/0205156 | A1 | 8/2011 | Gomez et al. | |
| 2012/0026129 | A1 | 2/2012 | Kawakami | |
| 2012/0108295 | A1 | 5/2012 | Schell et al. | 455/558 |
| 2012/0190354 | A1 * | 7/2012 | Merrien | H04W 4/001 455/422.1 |
| 2012/0249409 | A1 | 10/2012 | Toney et al. | |
| 2012/0324368 | A1 | 12/2012 | Putz et al. | |
| 2013/0017789 | A1 | 1/2013 | Chi et al. | |
| 2013/0023207 | A1 | 1/2013 | Chen et al. | |
| 2013/0171978 | A1 * | 7/2013 | Dumais | G06F 8/60 455/414.1 |
| 2013/0174049 | A1 | 7/2013 | Townsend et al. | |
| 2013/0227656 | A1 | 8/2013 | Holtmanns et al. | 726/4 |
| 2013/0333013 | A1 * | 12/2013 | Quach | H04L 9/3215 726/7 |
| 2013/0337803 | A1 * | 12/2013 | Christopher | H04W 48/18 455/432.3 |
| 2014/0057558 | A1 | 2/2014 | Cooper | |
| 2014/0066011 | A1 * | 3/2014 | Bradley | H04W 8/205 455/410 |
| 2014/0085050 | A1 | 3/2014 | Luna | |
| 2014/0171027 | A1 * | 6/2014 | Arkko | H04L 63/0853 455/411 |
| 2015/0040246 | A1 * | 2/2015 | Yuen | H04L 63/168 726/30 |
| 2015/0081837 | A1 * | 3/2015 | Bernier | H04W 8/24 709/217 |
| 2015/0237496 | A1 * | 8/2015 | Gao | H04W 8/205 455/414.1 |
| 2015/0373083 | A1 * | 12/2015 | Geurts | G06F 3/0481 715/740 |

FOREIGN PATENT DOCUMENTS

| | | |
|---|---|---|
| EP | 2461613 A1 | 6/2012 |
| EP | 2600319 | 6/2013 |
| GB | 2522044 A | 7/2015 |
| JP | 2008 073462 | 4/2008 |
| JP | 2009 049951 | 3/2009 |
| WO | 2011/021531 | 2/2011 |
| WO | 2011014043 A3 | 2/2011 |
| WO | 2012080763 A1 | 6/2012 |
| WO | 2013/085436 A1 | 6/2013 |

* cited by examiner

ENABLING SECURE APPLICATION DISTRIBUTION ON A (E)UICC USING SHORT DISTANCE COMMUNICATION TECHNIQUES

CROSS-REFERENCE TO RELATED APPLICATION

Priority is claimed from European patent application No. 14176921.6, filed Jul. 14, 2014, the entire disclosure of which hereby is incorporated by reference.

TECHNICAL FIELD

The disclosure pertains to the field of enabling distribution of a first security application comprised in the first wireless device to a second wireless device. The disclosure further pertains to methods and devices for the enabling.

BACKGROUND

Today there is an increased focus in Internet of things, IoT, and wireless and wearable devices. A single user may have several devices which uses wireless connections and applications and it can be a hazzle for users to handle all different kinds of accounts for the different devices.

The Universal Integrated Circuit Card, UICC, is a smart card used in mobile devices in Global System for Mobile Communications, GSM, and Universal Mobile Telecommunications System, UMTS, networks. In a GSM network, the UICC comprises a Subscriber Identity Module, SIM, application, and in a UMTS network, the UICC comprises a Universal Subscriber Identity Module, USIM, application. In some embodiments, the UICC comprises more than one application (e.g., a communication application), thereby enabling a mobile device comprising a UICC to access both GSM and UMTS networks. Additionally, the UICC ensures the integrity and security of all kinds of personal data and may contain security information associated with security applications. The current environment with removable UICCs in devices does not scale to a situation where there will be billions of connected devices. It is not possible to put physical UICCs in all these devices or individually configure electronic UICCs for these devices.

Furthermore, although reasonably convenient for individual consumers, the SIM card approach to provisioning may be impractical for a machine type application where a single entity may deploy hundreds of wireless devices across a large geographical area. For instance, in some cases a wireless device may be factory installed in a larger piece of equipment (e.g., an automobile), making later insertion of a SIM card impractical or impossible. In other instances, devices may be deployed over a wide geographical area, such that no single wireless operator can provide the needed coverage. Although the embedded SIM has become a hot topic within the machine-to-machine, M2M, domain it is progressing much slower when it comes to mobile devices such as smartphones. Phone operators are still much attached to the SIM card as it is today but the trend shows that the SIM card becomes smaller and smaller and it might one day be replaced by an embedded secure element.

In summary, problems arise for users with several wireless devices with regards to handling of accounts in different devices. Manufacturers also have a problem with devices which are integrated in other machines or machines that are too small or compact for insertion of SIM cards with regards to handling accounts.

European patent application EP 2 461 613 A1 proposes a solution for managing subscriptions using secure elements being installed, fixedly or not, in terminals. In EP 2 461 613 A1 a subscription may be downloaded from an operator platform 90 to the UICC 91, if the device is authorized. This is also referred to as OTA SIM application transfer.

SUMMARY

An aspect of the present disclosure is to provide a solution which seeks to mitigate, alleviate, or eliminate one or more of the above and below identified deficiencies in the art and disadvantages singly or in any combination. The present disclosure proposes method and devices for enabling distribution of security applications.

More specifically, the disclosure provides for methods and devices for enabling distribution of a first security application comprised in the first wireless device to a second wireless device.

The present disclosure is defined by the appended claims. Various advantageous embodiments of the disclosure are set forth by the appended claims as well as by the following description and the accompanying drawings.

According to some aspects the disclosure provides for a method performed in a system comprising a first wireless device, a second wireless device and a network node, for enabling distribution of a first security application comprised in the first wireless device to the second wireless device, the method comprising:

receiving, in the first wireless device, using a short distance communication technology, a hardware identifier of the second wireless device;

sending, from the first wireless device, the hardware identifier and information identifying the first security application to the network node;

receiving, in the network node, from the first wireless device, the hardware identifier of the second wireless device and the information identifying the security application; and authorising, in the network node, the second wireless device to receive and/or activate a second security application associated with a security application of the first wireless device.

In other words, the method is used to distribute security applications to one or several devices owned by the same user as the first wireless device.

According to some aspects, the method comprises the steps of displaying, in the first wireless device, security applications available for distribution in the first wireless device and receiving, in the first wireless device, user input on which security application to distribute to the second wireless device, the selected security application is the first security application.

According to some aspects, the authorizing, in the network node, comprises requesting authorizing information from a Service provider.

According to some aspects, the authorizing, in the network node, comprises that the network node communicates with an external server wherein the external server is a service provider server such as a Mobile Network Operator, MNO, server, a server provided by a bank, a server provided by a car manufacturer or a server from an application company offering services comprising security solutions.

According to some aspects, the method comprises the steps of sending, from the network node to the first wireless device, a first confirmation that the hardware identifier is received in the network node and/or that it is a correct hardware identifier and receiving, in the first wireless device, a first confirmation from the network node that the hardware identifier is received in the network node and/or that it is a correct hardware identifier.

According to some aspects, the method comprises the steps of sending, from the network node, the second security application associated with the first security application of the first wireless device, to the second wireless device.

According to some aspects, the method comprises the steps of sending, from the network node, a second confirmation to the first wireless device that the second security application associated with the first security application is authorized in the second wireless device and receiving, in the first wireless device, a second confirmation that the second security application associated with the first security application is authorized in the second wireless device.

According to some aspects, the method comprises the steps of receiving, in the first wireless device, user input to cancel the authorization to access the second security application, associated with the first security application, in the second wireless device, sending, from the first wireless device, instructions to the network node to cancel the authorization to the second wireless device, receiving, in the network node, instructions from the first wireless device to cancel the authorization to the second wireless device to access the second security application associated with the first security application and canceling, in the network node, the authorization to the second wireless device.

According to some aspects the disclosure provides for a method, performed in a first wireless device, of enabling distribution of a first security application comprised in the first wireless device to a second wireless device. In other words, the method is used to distribute security applications to one or several devices owned by the same user as the first wireless device.

According to some aspects, the method comprises the steps of receiving, using a short distance communication technology, a hardware identifier of the second wireless device and sending the hardware identifier and information identifying the first security application to a network node. Thereby enabling the network node to authorise the second wireless device to receive and/or activate a second security application associated with the first security application of the first wireless device. Since the first wireless device receives identification of the second wireless device it may communicate the identification to a network node and thus inform the node that the second wireless device should be authorised to use a security application present in the first wireless device, or a corresponding other security application as the one present in the first wireless device.

According to some aspects of the disclosure, the method comprises the steps of displaying security applications available for distribution in the first wireless device and receiving user input on which security application to distribute to the second wireless device, the selected security application is the first security application. The user can thereby select which security application to distribute if there are several on the first wireless device.

According to some aspects of the disclosure, the method comprises the step of receiving a first confirmation from the network node that the hardware identifier is received in the network node and/or that it is a correct hardware identifier.

According to some aspects of the disclosure, the method comprises the step of receiving a second confirmation that the second security application associated with the first security application is authorized in the second wireless device. The information of which security applications are distributed is thus collected in the first wireless device.

According to some aspects of the disclosure, the method comprises the steps of receiving user input to cancel the authorization to access the second security application, associated with the first security application, in the second wireless device and sending instructions to the network node to cancel the authorization to the second wireless device. If a user wants to for example sell a second wireless device she/he will want to cancel the authorization to the device.

According to some aspects of the disclosure, the method comprises that the first and second security applications comprises an application for enabling access to external services. For example bank services, music services, network services, etc.

According to some aspects of the disclosure, the method comprises that the first and second security application comprises a Subscriber Identity Module, SIM. In other words, the first wireless device can be used to provide a SIM to the second wireless device that is associated to the SIM of the first wireless device. The user may thereby add one or several devices that are connected to the same account as the first wireless device.

According to some aspects of the disclosure, the method comprises that the short distance communication technology is short distance radio technology. The technology is for example Bluetooth or Near Field Communication, NFC, technology.

According to some aspects of the disclosure, the method comprises that the short distance communication technology is Body Coupled Communication, BCC, technology. In other words, the information sent between the first wireless device and the second wireless device is performed over a Body Area Network, BAN.

According to some aspects the disclosure provides for a method, performed in a network node, of enabling distribution of a first security application comprised in a first wireless device to a second wireless device.

According to some aspects of the disclosure, the method comprises the steps of receiving, from the first wireless device, a hardware identifier of the second wireless device and information identifying the security application and authorising the second wireless device to receive and/or activate a second security application associated with a security application of the first wireless device. Since the identification is sent to the network node it is informed that the second wireless device should be authorised to use a security application present in the first wireless device, or a corresponding other security application as the one present in the first wireless device.

According to some aspects of the disclosure, the method comprises that authorizing comprises requesting authorizing information from a Service provider.

According to some aspects of the disclosure, the method comprises that authorizing comprises that the network node communicates with an external server.

According to some aspects of the disclosure, the method comprises that the external server is a service provider server such as a Mobile Network Operator, MNO, server, a server provided by a bank, a server provided by a car manufacturer or a server from an application company offering services comprising security solutions. The network node thus receives information from a supplier regarding the authentication of the second wireless device.

According to some aspects of the disclosure, the method comprises the step of sending the second security application associated with the first security application of the first wireless device, to the second wireless device.

According to some aspects of the disclosure, the method comprises the step of sending, to the first wireless device, a first confirmation that the hardware identifier is received in the network node and/or that it is a correct hardware identifier.

According to some aspects of the disclosure, the method comprises the step of sending a second confirmation to the first wireless device that the second security application associated with the first security application is authorized in the second wireless device.

According to some aspects of the disclosure, the method comprises the steps of receiving instructions from the first wireless device to cancel the authorization to the second wireless device to access the second security application associated with the first security application and canceling the authorization to the second wireless device.

According to some aspects of the disclosure, the method comprises that the first and second security application comprises an application for enabling access to external services.

According to some aspects of the disclosure, the method comprises that the first and second security application comprises a Subscriber Identity Module, SIM received from a SIM server.

According to some aspects of the disclosure, the method comprises that the sending comprises pushing SIM to the second wireless device using SMS or another connectivity protocol such as IP.

According to some aspects the disclosure provides for method, performed in a second wireless device (2), of enabling distribution of a first security application comprised in a first wireless device (1) to the second wireless device.

According to some aspects of the disclosure, the method comprises the steps of receiving, using a short distance communication technology, information identifying the first security application of the first wireless device and sending a hardware identifier of the second wireless device and information identifying the first security application to a network node, thereby enabling the network node to authorise the second wireless device to receive and/or activate a second security application associated with the first security application of the first wireless device.

According to some aspects the disclosure provides for a system, comprising a first wireless device, a second wireless device and a network node, for enabling distribution of a first security application comprised in the first wireless device to the second wireless device, comprising:
  a first wireless device, comprising:
    communication circuitry for short distance communication;
    processing circuitry configured to:
      i. receive, using the communication circuitry, a hardware identifier of the second wireless device; and
      ii. send, using the communication circuitry, the hardware identifier and information identifying the security application to a network node, thereby enabling the network node to authorise the second wireless device to get access to a second security application associated with the security application of the first wireless device;
  and
  a network node, comprising:
    communication circuitry for short distance communication;
    processing circuitry configured to:
      i. receive, using the communication circuitry, from the first wireless device, a hardware identifier of the second wireless device and information identifying the security application; and
      ii. authorise the second wireless device to access a security application associated with a second security application of the first wireless device;
  and a second wireless device.

According to some aspects the disclosure provides for a first wireless device, for enabling distribution of a first security application comprised in the first wireless device to a second wireless device.

According to some aspects of the disclosure, the first wireless device comprises communication circuitry for short distance communication and processing circuitry configured to receive, using the communication circuitry, a hardware identifier of the second wireless device and send, using the communication circuitry, the hardware identifier and information identifying the security application to a network node, thereby enabling the network node to authorise the second wireless device to get access to a second security application associated with the security application of the first wireless device.

According to some aspects of the disclosure, the first wireless device comprises that the first and second security application comprises an application for enabling access to external services.

According to some aspects of the disclosure, the first wireless device comprises that the first and second security application comprises a Subscriber Identity Module, SIM.

According to some aspects of the disclosure, the first wireless device comprises that the short distance communication technology is short distance radio technology.

According to some aspects of the disclosure, the first wireless device comprises that the short distance communication technology is Body Coupled Communication, BCC, technology.

According to some aspects the disclosure provides for a network node, for enabling distribution of a first security application comprised in a first wireless device to a second wireless device.

According to some aspects of the disclosure, the network node comprises communication circuitry for short distance communication and processing circuitry configured to receive, using the communication circuitry, from the first wireless device, a hardware identifier of the second wireless device and information identifying the security application and authorise the second wireless device to access a security application associated with a second security application of the first wireless device.

According to some aspects of the disclosure, the network node comprises that the first and second security application comprises an application for enabling access to external services.

According to some aspects of the disclosure, the network node comprises that the first and second security application comprises a Subscriber Identity Module, SIM received from a SIM server.

According to some aspects of the disclosure, the network node comprises that the authorizing comprises pushing SIM to the second wireless device using SMS or another connectivity protocol such as IP.

A second wireless device, for enabling distribution of a first security application comprised in a first wireless device to the second wireless device, comprising:

communication circuitry for short distance communication;

processing circuitry configured to:
receive, using a short distance communication technology, information identifying the first security application of the first wireless device; and
send a hardware identifier of the second wireless device and information identifying the first security application to a network node, thereby enabling the network node to authorise the second wireless device to receive and/or activate a second security application associated with the first security application of the first wireless device.

With the above description in mind, aspects of the present disclosure overcome at least some of the disadvantages of known technology as previously described.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
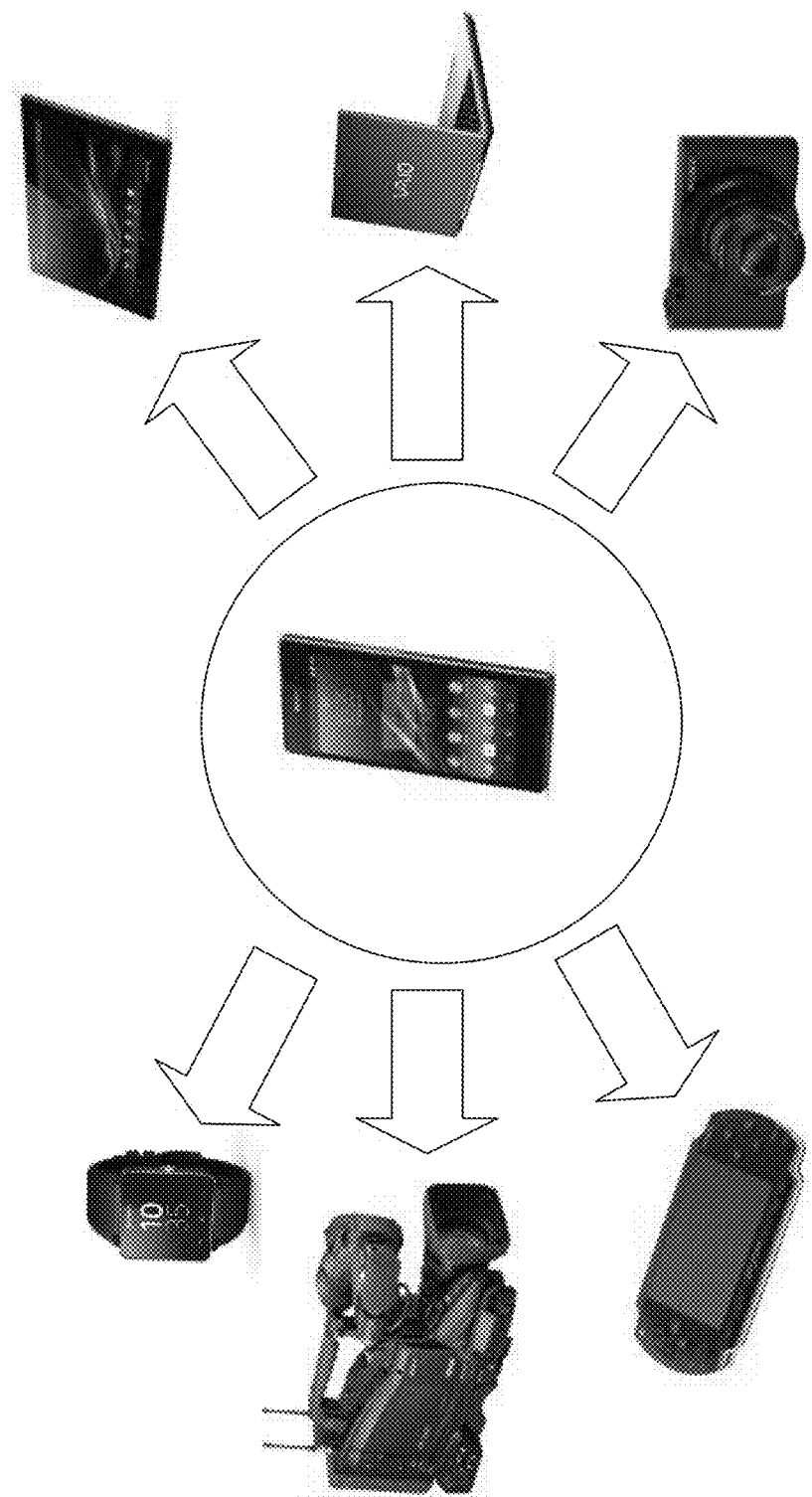
FIG. 1 illustrates different devices belonging to one user, and possibly using the same security applications.

Aspects of the present disclosure will be described more fully hereinafter with reference to the accompanying drawings. The devices and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "wireless device" includes portable communication device, portable radio communication equipment and wearables. A portable communication device or a portable radio communication device may be referred to below as a Smartphone or a Smartphone and includes all electronic equipment, including, but not limited to, capable of being used for voice and/or data communication. As will be appreciated, the disclosure may be used with Smartphones, other phones, personal digital assistants (PDAs), computers, other communication devices, etc. For brevity, the disclosure will be described by way of examples with respect to Smartphones, but it will be appreciated that the disclosure may be used with other communication devices. The term wearable and wearable device are used interchangeably and is referring to a wireless device which is worn somewhere on the body of a user. Examples of wearables are watches, wristbands, headsets, headbands, rings etc.

The term Universal Integrated Circuit Card, UICC, is used in a generic manner and includes all kinds of variants of UICC, such as embedded UICC, eUICC. Throughout the documents UICC is used interchangeably with (e)UICC, eUICC and also includes any kind of hardware that has a certain level of trust embedded.

The example embodiments presented herein are directed towards security application distribution using over-the-air, OTA, transfer. A security application as an application that protects a method or sensitive data and that executes in a secured environment such as the UICC. For better understanding of the proposed technique, OTA SIM transfer is now described in more detail.

FIG. 1 illustrates an example environment where the proposed methods are implemented. In FIG. 1 different M2M enabled devices belonging to one user are illustrated. A typical scenario is that the user wants to connect the devices to a cellular network using the same subscription that is used in the Smartphone. Each M2M enabled device then comprises a SIM module, which is typically a (e)UICC.

Figure 2:
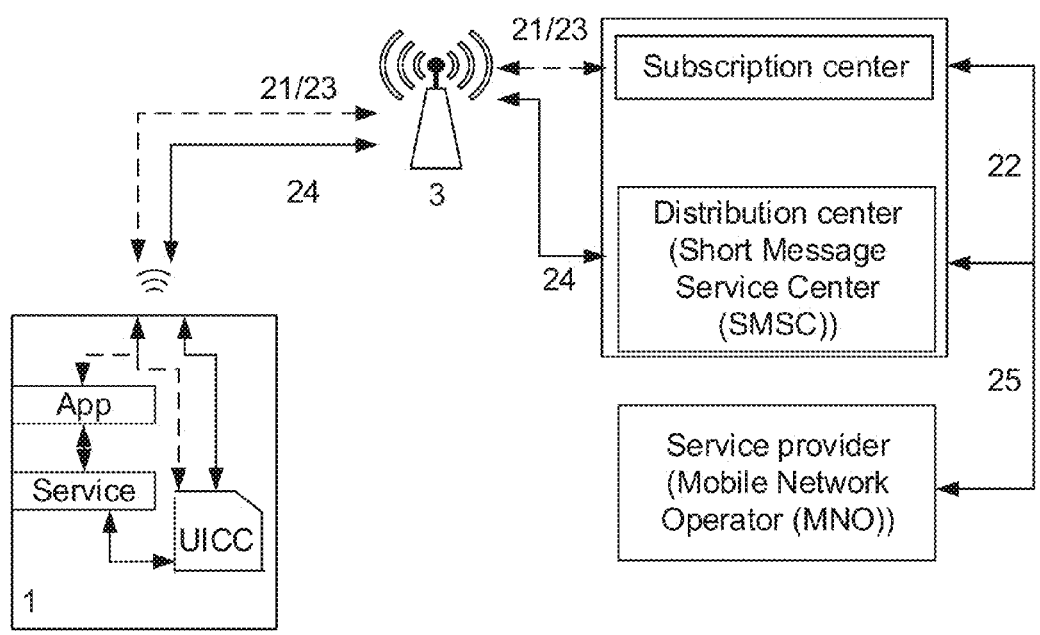
FIG. 2 illustrates downloading a subscription from an operator platform to a UICC.

FIG. 2 discloses an OTA SIM transfer overview. In this example a new subscription request 21 is sent from the mobile device 1, via a network node 3 to a subscription center using dedicated application and service. This is typically done using the cellular network or the local area network.

The request is received and handled by the SIM subscription center. An authorization request 25 is sent from the subscription center to the service provider (Mobile network Operator). Upon approval, the subscription center issues a request 22 to the distribution center to create/transfer a SIM profile to the mobile device using radio techniques (SMS or IP connection or any sufficient secure protocol or technique). The SIM transfer other-the-air is then sent to the device 24 and the status is communicated 23 to the device by the subscription center.

The idea primary aims to further develop the OTA concept in the M2M world. According to some aspects the proposed methods use NFC technology as a bridge for SIM installation on mobile devices such as tablets, clocks, computers, cameras or even phones. A common scenario is that a user already has a basic subscription (typically in their phone) and then wants to connect his or her other devices permanently or temporarily to a communication network. To share authentication information using NFC is one solution. However, such a solution puts high requirements on the initial connection of the M2M enabled devices and is also considered insecure.

The proposed solution, that will now be described referring to FIGS. 3 to 7, provides an improved solution for security application distribution. More specifically, the disclosure provides for methods and devices for enabling distribution of a first security application comprised in the first wireless device 1 to a second wireless device 2. The proposed solution allows e.g. a consumer to use a short distance communication technology to trigger the distribution of a security application onto another device and possibly associate this new security application with the existing one for subscription and billing purpose. By using short distance communication technology the master device already equipped with a security application will compute necessary information and initiate an OTA transfer of a new security application onto another slave device. Note that this implies that the security application is still downloaded OTA from the server, as described in FIG. 2. Security application data is not transferred over the short distance communication technology, but it is used as a trigger and enabler. Also note that the security application used in the second wireless device does not have to be the exact same security application as the on in the first wireless device but one associated with the security application of the first wireless device.

Figure 3:
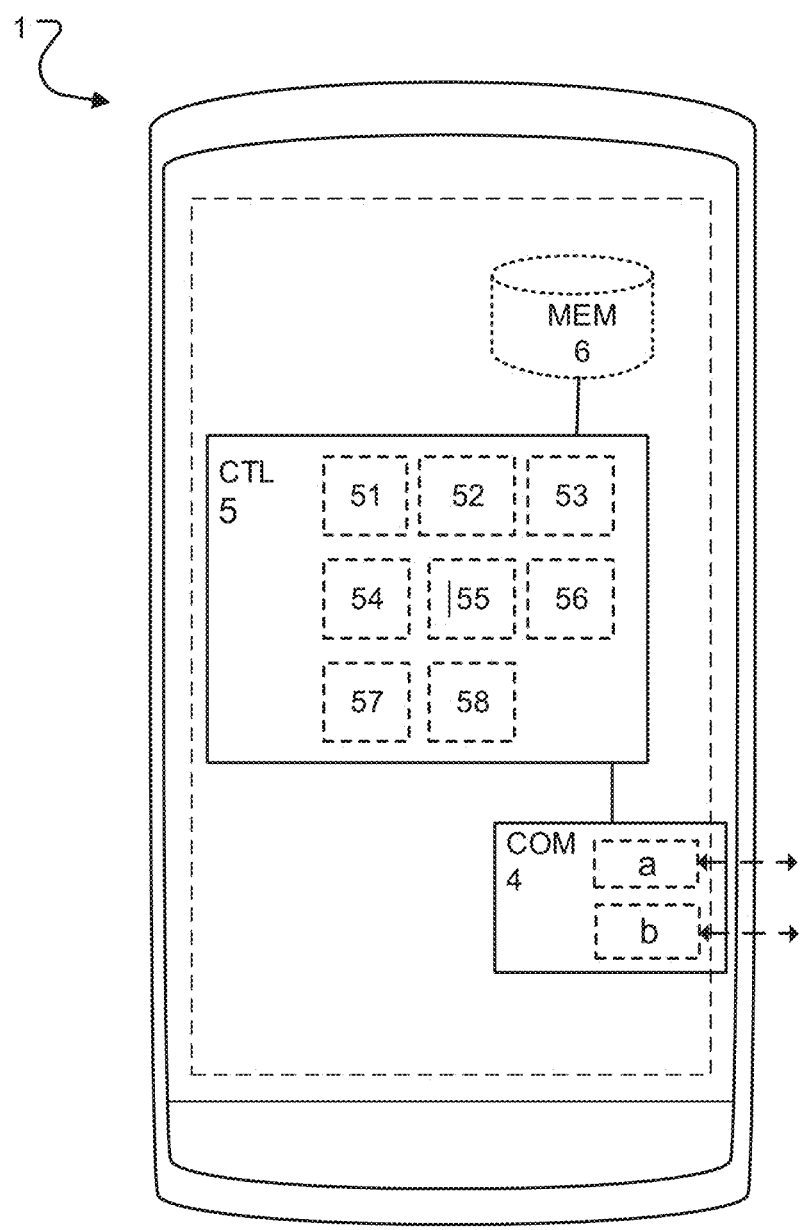
FIG. 3 illustrates an example of a wireless device according to some of the example embodiments.

FIG. 3 shows an example of a first wireless device, here being shown as a Smartphone, for enabling distribution of a first security application comprised in the first wireless device to a second wireless device. The first wireless device comprises communication circuitry 4 for short distance communication and processing circuitry 5. As shown in the figure, the first wireless device may comprise communication circuitry 4 configured to receive and transmit any form of communications or control signals within a network. It should be appreciated that the communication circuitry may be comprised as any number of transceiving, receiving, and/or transmitting units or circuitry a, b. It should further be appreciated that the communication circuitry may be in the form of any input/output communications port known in the art. The communication circuitry may comprise RF circuitry and baseband processing circuitry (not shown). An advantage of the present invention is providing, for users, a "One touch" user experience using short distance technologies, such as NFC, to integrate security applications present in a first wireless device of a user to other wireless devices of the same user.

The first wireless device 1 may further comprise at least one memory unit or circuitry 6 that may be in communication with the communication circuitry 4. The memory may be configured to store received or transmitted data and/or executable program instructions. The memory may also be configured to store any form of beamforming information, reference signals, and/or feedback data or information. The memory may be any suitable type of computer readable memory and may be of volatile and/or non-volatile type.

The first wireless device 1 may further comprise processing circuitry 5 which may be configured to perform the proposed methods. The processing circuitry may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 4:
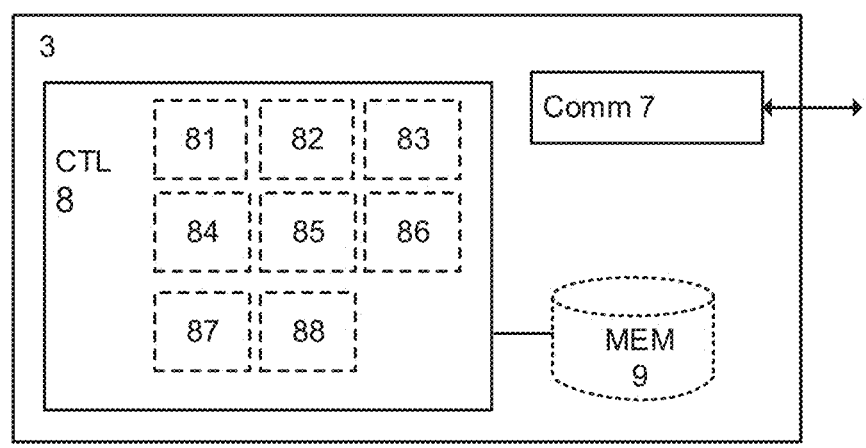
FIG. 4 illustrates an example of a network node according to some of the example embodiments.

FIG. 4 shows an example of a network node 3, for enabling distribution of a first security application comprised in a first wireless device 1 to a second wireless device 2. The network node comprises communication circuitry 7 for short distance communication and processing circuitry 8. As shown in FIG. 4, the network node 3 may comprise a communication circuitry 7 configured to receive and transmit data over a communication network. It should further be appreciated that the communication circuitry may be in the form of any input/output communications port known in the art. The communication circuitry may comprise RF circuitry and baseband processing circuitry (not shown).

The network node 3 may further comprise at least one memory unit or circuitry 9 that may be in communication with the communication circuitry 7. The memory may be configured to store received or transmitted data and/or executable program instructions. The memory may be any suitable type of computer readable memory and may be of volatile and/or non-volatile type.

The processing circuitry 8 of the network node 3 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Figure 6:
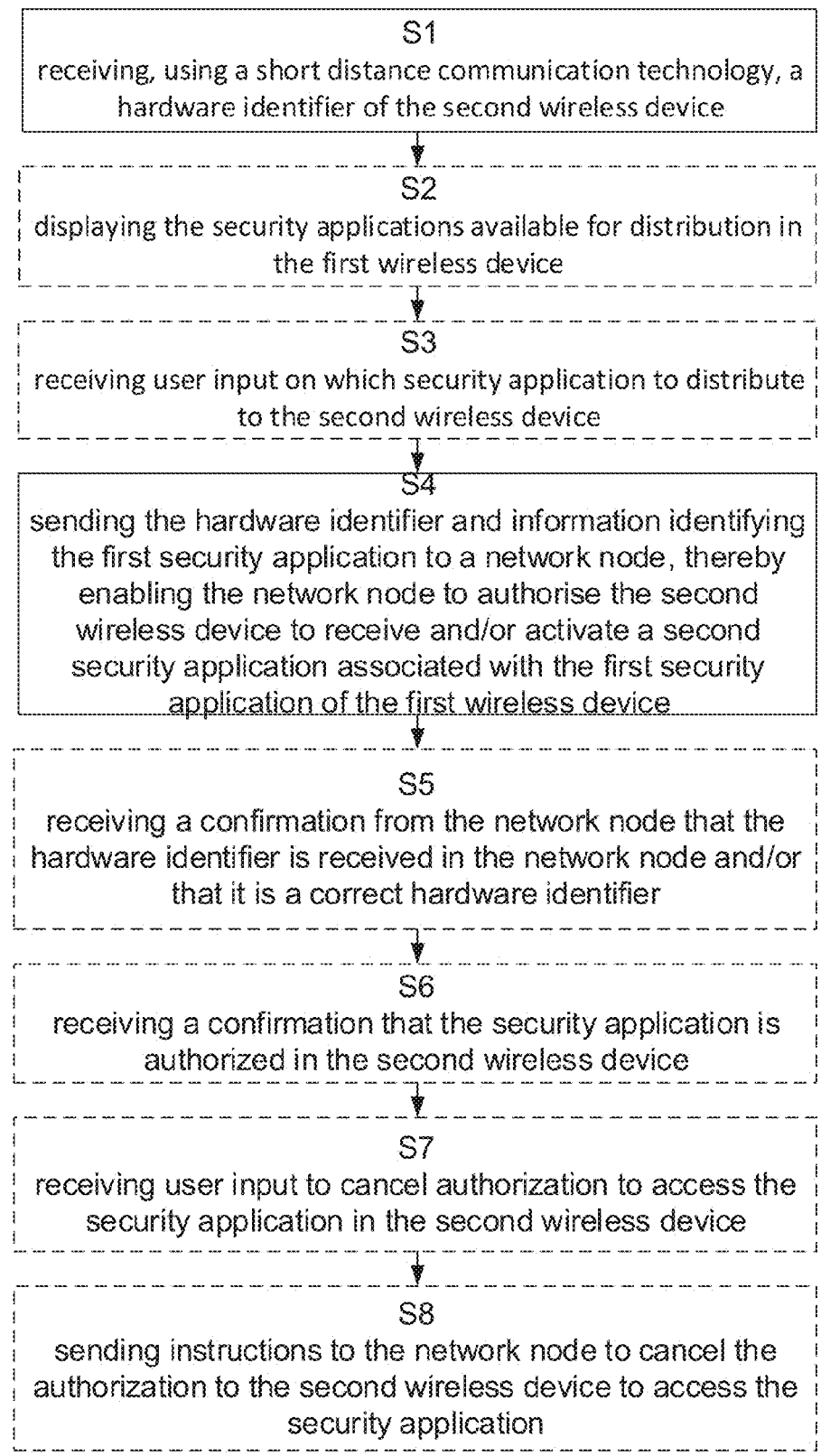
FIG. 6 is a flowchart illustrating embodiments of method steps of the first wireless device.
Figure 7:
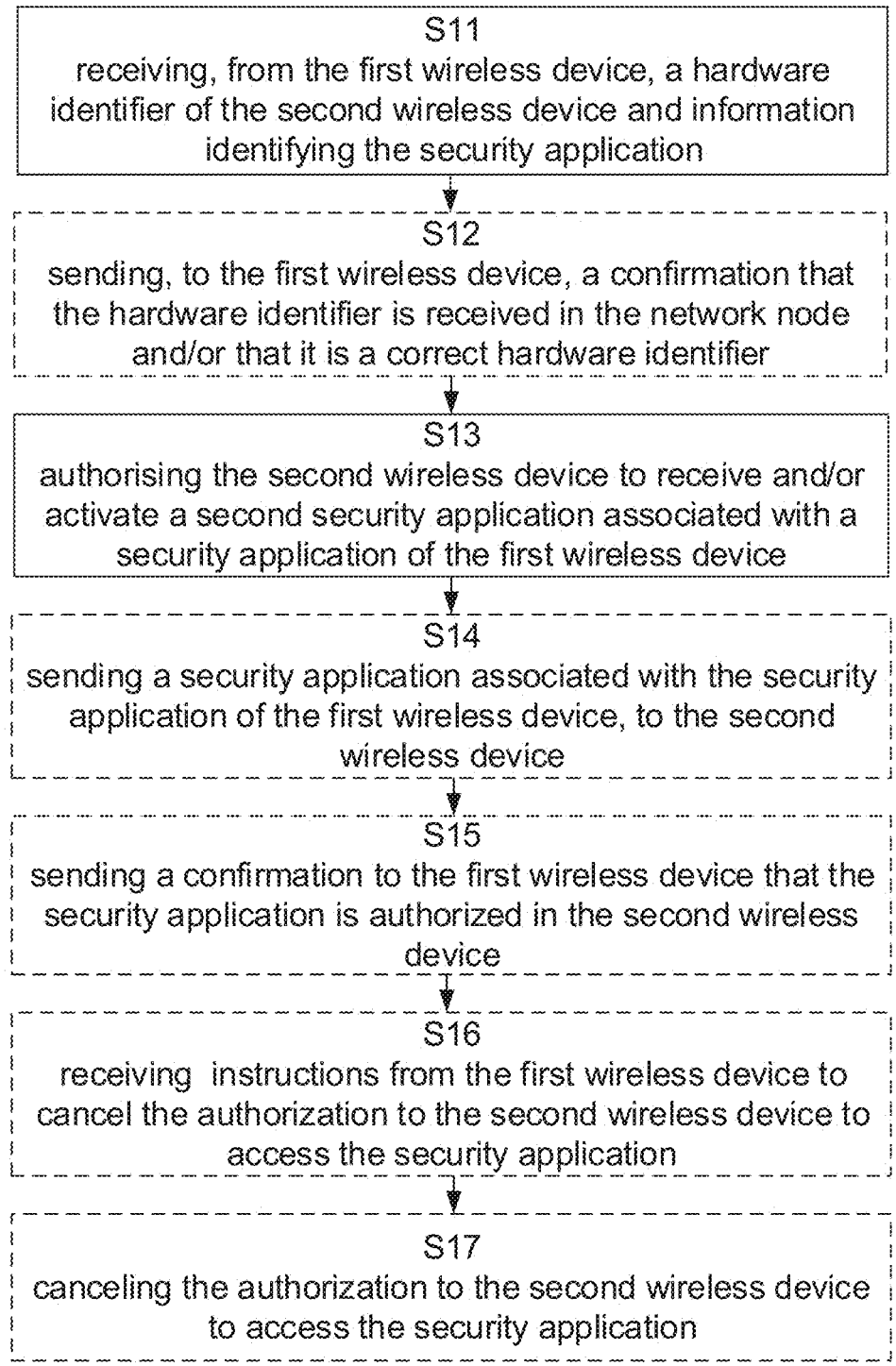
FIG. 7 is a flowchart illustrating embodiments of method steps in a network node.

FIG. 6 is a flow diagram depicting example operations which may be taken by the wireless device of FIG. 3 and FIG. 7 is a flow diagram depicting example operations which may be taken by the network node of FIG. 4.

It should be appreciated that FIGS. 6 and 7 comprise some operations which are illustrated with a solid border and some operations which are illustrated with a dashed border. The operations which are comprised in a solid border are operations which are comprised in the broadest example embodiment. The operations which are comprised in a dashed line are example embodiments which may be comprised in, or a part of, or are further operations which may be taken in addition to the operations of the broader example embodiments. It should be appreciated that the operations need not be performed in order. Furthermore, it should be appreciated that not all of the operations need to be performed.

According to some aspects the disclosure provides for a method, performed in the first wireless device 1, of enabling distribution of a first security application comprised in the first wireless device to a second wireless device 2. In other words, the method is used to distribute security applications to one or several devices owned by the same user as the first wireless device.

The proposed method comprises the step of receiving S1, using a short distance communication technology, a hardware identifier of the second wireless device. The processing circuitry 5 of the wireless device is configured to receive S1, using the communication circuitry 4, a hardware identifier of the second wireless device. According to some aspects the processing circuitry comprises an identifier receiver module 51 for receiving the hardware identifier. In the case where a UICC is used for storing the security application on the second wireless device, this step implies that the master device, which is the first wireless device 1, reads e.g. the eUICC identifier from a slave device, which is the second wireless device, using e.g. NFC. According to some aspects the hardware identifier is a hardware identifier of the UICC. According to some aspects, the hardware identifier is meant to identify the hardware entity that receives the Security application.

The method further comprises the step of sending S4 the hardware identifier and information identifying the first security application to a network node 3 thereby enabling the network node to authorise the second wireless device to receive and/or activate a second security application associated with the first security application of the first wireless device. The processing circuitry 5 of the wireless device is configured to send S4, using the communication circuitry 4, the hardware identifier and information identifying the security application to the network node 3. According to some aspects the processing circuitry comprises a sending module 52 for sending the hardware identifier and security application identifying information. Both the hardware identifier and security application identifying information are public data and can be retrieved and broadcasted without inducing any security risks. In other words, the second wireless device is authorized to perform one of, or both, of: receiving a second security application associated with the first security application or activating a second security application associated with the first security application. Since the first wireless device receives identification of the second wireless device it may communicate the identification to a network node and thus inform the node that the second wireless device should be authorised to use a security application present in the first wireless device, or a corresponding other security application as the one present in the first wireless device. In other words, the network node receives the hardware identifier from the first wireless device and is informed that the first wireless device wants to provide the second wireless device access to a security application, or to download and utilize a security application. Other information may of course also be exchanged between the devices; such as identifying information of the first wireless device. Thereby, the first wireless device provides the identity of the second device to the network node and enables the network node to authorise the second wireless device to receive and/or activate a security application associated with the security application of the first wireless device, from the network node. The first wireless device is already authorised to use the security application so the first wireless device is then considered by the network node to be authorised to indicate other devices that should be authorised to use the same security applications. In order to establish a certain level of trust in between the first wireless device and the network node, mandatory credentials are needed by the first wireless device to access the network node. Any request coming from a wireless device to the network node can only be validated by the network node when by a combination of device credentials and user authorization. In order to establish a level of trust in between wireless devices and the network node, it is mandatory that any applications communicating with the network node directly or through the UICC can provide credentials for identification and that they are signed with a certificate issued by the network node. The second device may have or may not have credentials to perform a request but the first device have credentials since it already has a subscription.

According to some aspects, the UICC or a trusted application of the first wireless device sends the hardware identifier and the information identifying the security application to the network node via communication circuitry.

The second security application is an application in the second wireless device corresponding to the first security application of the first wireless device. The method may be used to move a security application from the first wireless device to the second wireless device by first performing the claimed method and then cancelling the authorisation to use the security application in the first wireless device.

The proposed technique provides a high level of security by allowing the device is already registered to advise the id of the new unit to be set up. Furthermore, the requirements can be lower at the initial connection which the new device need to have. It may be enough that it can receive any SMS containing the new security application while it is already connected device can use its data connection to download the info about subscription types, costs, etc.

According to some aspects of the disclosure, the method in the first wireless device further comprises the step of displaying S2 security applications available for distribution in the first wireless device. The processing circuitry 5 of the first wireless device is configured to display S2, using a display of the first wireless device, security applications available for distribution in the first wireless device. According to some aspects the processing circuitry comprises a displaying module 53 displaying the security applications. According to some aspects of the disclosure, the method further comprises the step of receiving S3 user input on which security application to distribute to the second wireless device, the selected security application is the first security application. The processing circuitry 5 of the wireless device is configured to receive S3 the user input. According to some aspects the processing circuitry comprises a receiving module 54 for receiving the user input. User input is for example inputted by the user on a touch screen of the wireless device. The user can thereby select which security application to distribute if there are several on the first wireless device.

The first and second security application comprises, according to some aspects, an application for enabling access to external services. Such application is for example an app requiring password, a bank ID requiring a program with a downloaded id and a login or authentication from a hardware or software in the wireless device. The external services are for example bank services, music services, network services, etc.

Figure 5A:
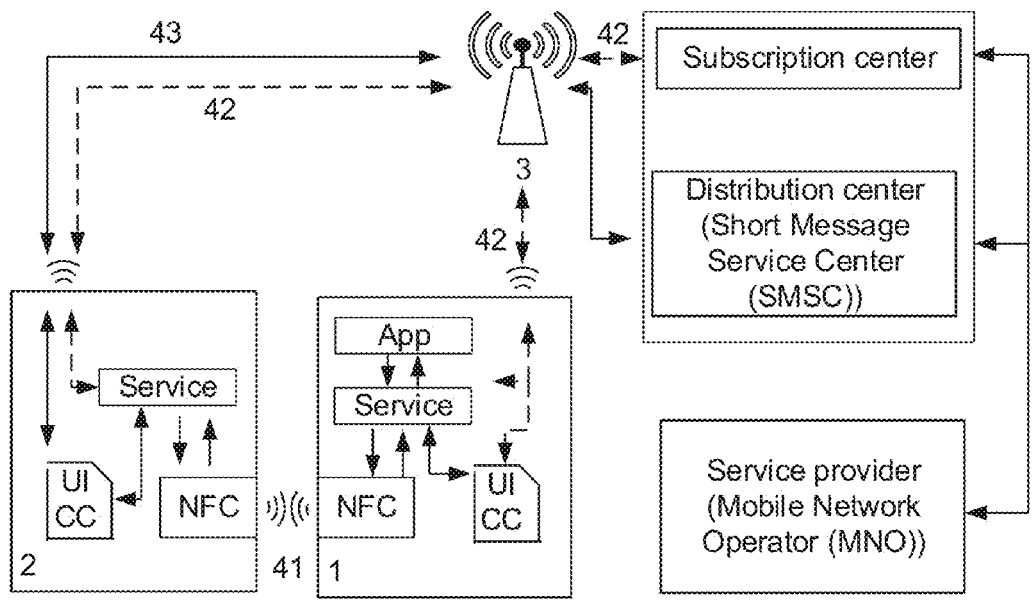
FIGS. 5a and 5b illustrates two example embodiment of the proposed method of security application distribution.
Figure 5B:
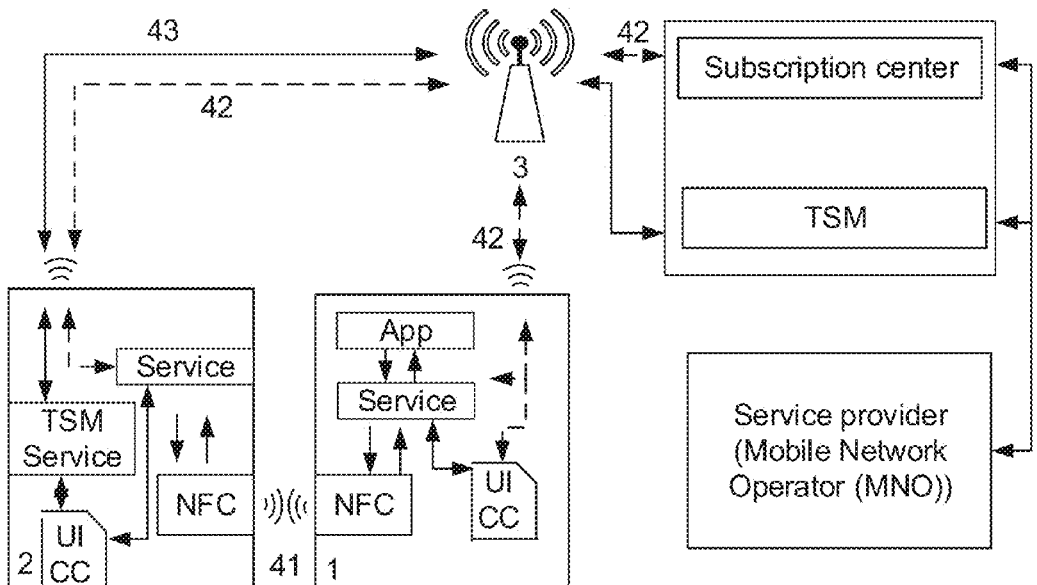

FIGS. 5a and 5b illustrates example embodiments of the disclosure where, again a SIM security application will be used as an example. In the example, the first wireless device 1 is connected to a network node 3 over a wireless network, for example a cellular network of Wi-Fi. A M2M enabled device 2, such as a camera or wearable, to which the user of the first wireless device 1 wants to share a security application, such as a SIM or subscription, is shown in the vicinity of the first wireless device 1. The figure illustrates a more detailed example embodiment. In this example, the dashed lines and squares illustrate operations in the application and service layer, wherein the solid lines represents operations in the control plane. In the first step 41, information on the devices, i.e. the second wireless device, and subscription is collected by a service on respective device and communicated to the subscription requester, i.e. the first wireless device, through short distance communication technology, in this example NFC. In the second step 42, a SIM request is sent to the subscription center by one of the devices. In the third step 43, the SIM is sent over the air to the slave device and the status is communicated to the devices on the service layer by the subscription center.

In FIG. 5b there is a Trusted Service Manager, TSM, in the subscription distribution center which acts as a neutral broker that sets up business agreements and technical connections with mobile network operators, phone manufacturers or other service providers controlling the secure element on mobile devices. In this case there is a matching TSM service in the wireless devices which is an application that provides a secure connection with the subscription distribution center and enables different transfer methods over-the-internet, OTI. The TSM service is proprietary and establishes a trusted environment between the wireless devices and the TSM. The TSM service has also a trusted communication channel to the (e)UICC and acts as a proxy in between the (e)UICC and the TSM.

According to some aspects of the disclosure, the method in the first wireless device further comprises the step of receiving S5 a first confirmation from the network node that the hardware identifier is received in the network node and/or that it is a correct hardware identifier. The processing circuitry 5 of the first wireless device is configured to receive S5 the first confirmation via the communication circuitry 4. According to some aspects the processing circuitry comprises a receiving module 55 for receiving the first confirmation. Thus the first wireless device is informed if it needs to resend any information regarding the second wearable device.

According to some aspects of the disclosure, the method in the first wireless device further comprises the step of receiving S6 a second confirmation that the second security application associated with the first security application is authorized in the second wireless device. The processing circuitry 5 of the first wireless device is configured to receive S5 the second confirmation via the communication circuitry 4. According to some aspects the processing circuitry comprises a receiving module 56 for receiving the second confirmation. The information of which security applications are distributed is thus collected in the first wireless device. It may be useful for the user of the wireless devices to be able to check on the first wireless device, which security applications have been authorized in the second wireless device.

According to some aspects of the disclosure, the method in the first wireless device further comprises the step of receiving S7 user input to cancel the authorization to access the second security application, associated with the first security application, in the second wireless device and sending (S8) instructions to the network node to cancel the authorization to the second wireless device. The processing circuitry 5 of the first wireless device is configured to receive S7 the user input and to send S8 the instructions via the communication circuitry 4. User input is for example inputted by the user on a touchscreen of the wireless device. According to some aspects the processing circuitry comprises a receiving module 57 for receiving the user input and a sending module 58 for sending. If a user wants to for example sell a second wireless device she/he will want to cancel the authorization to the device.

According to some aspects of the disclosure, the first and second security application comprises a Subscriber Identity Module, SIM. In other words, the first wireless device can be used to provide a SIM to the second wireless device that is associated to the SIM of the first wireless device. The user may thereby add one or several devices that are connected to the same account as the first wireless device.

If the security application above is a SIM and the first wireless device 1 is a Smartphone and the second wireless device 2 is a M2M enabled device comprising a generic SIM module, which does not yet hold a proper subscription, the network node is for example a server handling generic SIMs issued by e.g. one SIM module manufacturer. The server may provide subscriptions of several different operators. In such a case, a connection between the Smartphone 1 and the M2M enabled device 2 is established and an identifier is sent defining a generic SIM module of the M2M enabled device to the Smartphone, e.g. eUICC ID Microcontroller's universal ID number) using near field communication e.g. NFC. This is a tagging step, which is typically performed by bringing the devices in close proximity. The Smartphone 1 is informed about the hardware identity of the generic SIM module of the M2M enabled device 2. The generic SIM module is a secure hardware element comprised in the wireless device 1. Then the Smartphone 1 sends the hardware identity of the generic SIM module of the M2M enabled device 2 to the SIM backend server. According to one aspect the Smartphone knows the identity of the M2M enabled device 2 and sends in addition e.g. the device ID and possibly more information such as subscriber identity, data limit, billing information etc. to a SIM backend server with instructions to provide the M2M enabled device 2 with a SIM application that is associated with the SIM Application of 1. According to some aspects a secure connection is established between the wireless device and the SIM backend server before the hardware identity is communicated. The secure connection is established using conventional security protocols. Then, according to one aspect, the server then pushes a SIM application (or updates a SIM application) to the M2M enabled device 2. This step implies that the M2M enabled device somehow connects to the SIM backend server, which may be done using Wi-Fi or over cellular access e.g. using 1 as modem/proxy or a provisioning profile allowing cellular connection directly from the M2M enabled device for the sole purpose of downloading the SIM application and personalization data. In the latter case, the SIM module may comprise an initial SIM profile that may be used to initially connect the device to the SIM backend.

The M2M enabled device 2 typically already comprises a generic SIM module and comprises a processor, memory and applications. According to one variant this step comprises updating an existing SIM application with information needed to provide a complete SIM which is associated with a unique subscription. According to another aspect a completely new SIM application is downloaded. By using this method, these new devices will get unique personalized SIM applications but the operator needs to obtain information about billing for the new devices to be managed. In this scenario, the user shall pay through their basic subscription.

It is important to stress that the disclosure, when the security application is a SIM feature, is not dependent of the physical storage of the SIM. As described above, it is today technically possible to install a SIM over the air, OTA, into a SIM card or into an embedded secure element. However, the proposed method makes this feature widely applicable to all kind of mobile device.

According to some aspects of the disclosure, the short distance communication technology is short distance radio technology. The technology is for example Bluetooth or Near Field Communication, NFC, technology.

According to some aspects of the disclosure, the short distance communication technology is Body Coupled Communication, BCC, technology. In other words, the information sent between the first wireless device and the second wireless device is performed over a Body Area Network, BAN. By using BCC it is required that the user touches both the first and the second wireless device with her/his body, or at least that the devices are in very close proximity to the users body when communicating the hardware identifier of the second wireless device.

According to some aspects the disclosure provides for a method, performed in a network node 3, of enabling distribution of a first security application comprised in a first wireless device 1 to a second wireless device 2.

According to some aspects of the disclosure, the method in the network node comprises the step of receiving S11, from the first wireless device 1, a hardware identifier of the second wireless device 2 and information identifying the security application. The processing circuitry 8 of the network node is configured to receive 11 the hardware identifier and the identifying information via the communication circuitry 7. According to some aspects the processing circuitry comprises a receiving module 81 for receiving.

According to some aspects of the disclosure, the method in the network node comprises the step of authorising S13 the second wireless device to receive and/or activate a second security application associated with a security application of the first wireless device. The processing circuitry 8 of the network node is configured to authorize S13 the second wireless device. According to some aspects the processing circuitry comprises an authorizing module 82 for authorizing. Since the identification information is sent to the network node it is informed that the second wireless device should be authorised to use a security application present in the first wireless device, or a corresponding other security application as the one present in the first wireless device. When the security application is a SIM, authorizing comprises e.g. storing the UICC number in a list together with information defining the SIM or subscription of the master device. The SIM is for example an application installed on a SIM module and the SIM module is a hardware circuit for example a Universal Integrated Circuit Card, UICC.

According to some aspects of the authorizing S13 comprises requesting authorizing information from a Service provider. The processing circuitry 8 of the network node is configured to request the authorizing information via the communication circuitry 7. According to some aspects the processing circuitry comprises a requesting module 83 for authorizing. According to some aspects the network node requests authorization from the Service provider via the subscription center. According to some aspects the Service provider then dispatch an execution order to the distribution center.

According to some aspects, the authorisation of the second wireless device to receive and/or activate a second security application associated with a security application of the first wireless device comprises that the authorisation is time-limited. In other words, the second wireless device can only use the second security application for a limited amount of time, for example 1 day or 1 month or 1 year. The time limit can be any amount of time set by either the user of the first wireless device or of the service provider of that particular security application.

According to some aspects of the disclosure, the authorizing S13 comprises that the network node communicates with an external server. The external server is for example a service provider server such as a Mobile Network Operator, MNO, server, a server provided by a bank, a server provided by a car manufacturer or a server from an application software company. The network node thus receives information from a supplier regarding the authentication of the second wireless device.

According to some aspects of the disclosure, the method comprises the step of sending S14 the second security application associated with the first security application of the first wireless device, to the second wireless device. The processing circuitry 8 of the network node is configured to send S14 the second security application via the communication circuitry 7.

According to some aspects the processing circuitry comprises a sending module 84 for sending. The second wireless device is thus authorized and enabled to use the second security application. As previously discussed, the second security application is a security application that corresponds to the first security applications. That is, it is not necessarily the exact same security application but it gives the second wireless device access to services that are the same as services that the first security application is allowed access to.

According to some aspects of the disclosure, the method comprises the step of sending S12, to the first wireless device, a first confirmation that the hardware identifier is received in the network node and/or that it is a correct hardware identifier. The processing circuitry 8 of the network node is configured to send S12 the first confirmation via the communication circuitry 7. According to some aspects the processing circuitry comprises a sending module 85 for sending.

According to some aspects of the disclosure, the method comprises the step of sending S15 a second confirmation to the first wireless device that the second security application associated with the first security application is authorized in the second wireless device. The processing circuitry 8 of the network node is configured to send S15 the second confirmation via the communication circuitry 7. According to some aspects the processing circuitry comprises a sending module 86 for sending.

According to some aspects of the disclosure, the method comprises the step of receiving S16 instructions from the first wireless device to cancel the authorization to the second wireless device to access the second security application associated with the first security application and cancelling S17 the authorization to the second wireless device. The processing circuitry 8 of the network node is configured to receive S16 the instructions via the communication circuitry 7. According to some aspects the processing circuitry comprises a receiving module 87 for receiving. The processing circuitry 8 of the network node is further configured to cancel S17 the authorization to the second wireless device. According to some aspects the processing circuitry comprises a cancelling module 88 for receiving.

Cancelling the authorization may comprise communication with the subscription distribution center and the first and/or the second wireless device. An account may for example be cancelled in the subscription distribution center. It may be beneficial for the user of the wireless devices that the first wireless device comprises information on all active shared security application in other devices, therefore the information about cancellation may be sent to the first device. The second wireless device is also informed about the cancellation.

The first and second confirmations have been discussed above when discussing the method performed in the first wireless device.

As previously discussed the first and second security application comprises an application for enabling access to external services. For example, the first and second security application comprises a Subscriber Identity Module, SIM received from a SIM server and the sending S13 comprises pushing SIM to the second wireless device using SMS or another connectivity protocol such as IP.

According to some aspects the disclosure provides for method, performed in a second wireless device 2, of enabling distribution of a first security application comprised in a first wireless device 1 to the second wireless device.

According to some aspects of the disclosure, the method comprises the steps of receiving, using a short distance communication technology, information identifying the first security application of the first wireless device and sending a hardware identifier of the second wireless device and information identifying the first security application to a network node, thereby enabling the network node to authorise the second wireless device to receive and/or activate a second security application associated with the first security application of the first wireless device.

According to some aspects, the disclosure provides for a second wireless device 2, for enabling distribution of a first security application comprised in a first wireless device 1 to the second wireless device, comprising:
- communication circuitry 4 for short distance communication;
- processing circuitry 7 configured to:
  - receive S1, using a short distance communication technology, information identifying the first security application of the first wireless device; and
  - send S4 a hardware identifier of the second wireless device and information identifying the first security application to a network node 3, thereby enabling the network node to authorise the second wireless device to receive and/or activate a second security application associated with the first security application of the first wireless device.

Regardless of the device, all applications communicating with the subscription center must establish a level of trust which is done by credentials and certificates in addition to user authorization.

According to some aspects, the UICC of the second wireless device sends the hardware identifier and the information identifying the security application to the network node via communication circuitry.

According to some aspects the disclosure provides for a method performed in a system comprising a first wireless device, a second wireless device and a network node, for enabling distribution of a first security application comprised in the first wireless device to the second wireless device. The steps of the individual devices of the system have been described in detail above and will here only be discussed briefly. The method of the system comprises:
- receiving, in the first wireless device, using a short distance communication technology, a hardware identifier of the UICC of the second wireless device;
- sending, from the first wireless device, the hardware identifier and information identifying the first security application to the network node;
- receiving, in the network node, from the first wireless device, the hardware identifier of the second wireless device and the information identifying the security application; and
- authorising, in the network node, the second wireless device to receive and/or activate a second security application associated with a security application of the first wireless device.

In other words, the method is used to distribute security applications to one or several devices owned by the same user as the first wireless device.

According to some aspects, the method comprises the steps of displaying, in the first wireless device, security applications available for distribution in the first wireless device and receiving, in the first wireless device, user input on which security application to distribute to the second wireless device, the selected security application is the first security application.

According to some aspects, the authorizing, in the network node, comprises requesting authorizing information from a Service provider.

According to some aspects, the authorizing, in the network node, comprises that the network node communicates with an external server and wherein the external server is a service provider server such as a Mobile Network Operator, MNO, server, a server provided by a bank, a server provided by a car manufacturer or a server from an application software company.

According to some aspects, the method comprises the steps of sending, from the network node to the first wireless device, a first confirmation that the hardware identifier is received in the network node and/or that it is a correct hardware identifier and receiving, in the first wireless device, a first confirmation from the network node that the hardware identifier is received in the network node and/or that it is a correct hardware identifier.

According to some aspects, the method comprises the steps of sending, from the network node, the second security application associated with the first security application of the first wireless device, to the second wireless device.

According to some aspects, the method comprises the steps of sending, from the network node, a second confirmation to the first wireless device that the second security application associated with the first security application is authorized in the second wireless device and receiving, in the first wireless device, a second confirmation that the second security application associated with the first security application is authorized in the second wireless device.

According to some aspects, the method comprises the steps of receiving, in the first wireless device, user input to cancel the authorization to access the second security application, associated with the first security application, in the second wireless device, sending, from the first wireless device, instructions to the network node to cancel the authorization to the second wireless device, receiving, in the network node, instructions from the first wireless device to cancel the authorization to the second wireless device to access the second security application associated with the first security application and canceling, in the network node, the authorization to the second wireless device.

According to some aspects the disclosure provides for a system, comprising a first wireless device, a second wireless device and a network node, for enabling distribution of a first security application comprised in the first wireless device to the second wireless device, comprising:
- a first wireless device, comprising:
  - communication circuitry for short distance communication;
  - processing circuitry configured to:
    - i. receive, using the communication circuitry, a hardware identifier of the second wireless device; and
    - ii. send, using the communication circuitry, the hardware identifier and information identifying the security application to a network node, thereby enabling the network node to authorise the application associated with the security application of the first wireless device;

and
- a network node, comprising:
  - communication circuitry for short distance communication;
  - processing circuitry configured to:
    - i. receive, using the communication circuitry, from the first wireless device, a hardware identifier of the second wireless device and information identifying the security application; and
    - ii. authorise the second wireless device to access a security application associated with a second security application of the first wireless device;
- and a second wireless device.

According to some aspects the communication between entities in the present disclosure is always secure.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in a system comprising a first wireless device including a first security application, a second wireless device and a network node, for enabling distribution of the first security application to the second wireless device, the method comprising:

receiving, in the first wireless device, using a short distance communication technology, a hardware identifier of the second wireless device;

sending, from the first wireless device, the hardware identifier of the second wireless device and information identifying the first security application to the network node;

receiving, in the network node, from the first wireless device, the hardware identifier of the second wireless device and the information identifying the first security application;

sending, from the network node to the first wireless device, a first confirmation that the hardware identifier is received in the network node and/or that it is a correct hardware identifier;

receiving, in the first wireless device, a first confirmation from the network node that the hardware identifier is received in the network node and/or that it is a correct hardware identifier;

authorising, in the network node, the second wireless device to receive and/or activate a second security application associated with the first security application of the first wireless device;

sending, from the network node, a second confirmation to the first wireless device that the second security application associated with the first security application is authorized in the second wireless device;

receiving, in the first wireless device, a second confirmation that the second security application associated with the first security application is authorized in the second wireless device; and sending the second security application associated with the first security application of the first wireless device from the network node to the second wireless device;

wherein the first security application and the second security application are both software applications executed by a processor in a secured environment such that, when executed, the first security application and the second security application restrict access to sensitive data;

receiving, in the first wireless device, user input to cancel the authorization to access the second security application, associated with the first security application, in the second wireless device;

sending, from the first wireless device, instructions to the network node to cancel the authorization to the second wireless device;

receiving, in the network node, instructions from the first wireless device to cancel the authorization to the second wireless device to access the second security application associated with the first security application; and cancelling, in the network node, the authorization to the second wireless device.

2. The method according to claim 1, comprising:
displaying, in the first wireless device, security applications available for distribution in the first wireless device; and
receiving, in the first wireless device, user input on which security application to distribute to the second wireless device, wherein the selected security application is the first security application.

3. The method according to claim 1, wherein authorizing, in the network node, comprises requesting authorizing information from a Service provider.

4. The method according to claim 3, wherein authorizing, in the network node, comprises that the network node communicates with an external server wherein the external server is a service provider server.

5. The method according to claim 1, wherein the first security application is associated with a particular subscription and activating the second security application associates the second security application with the particular subscription.

6. A method, performed in a first wireless device, of enabling distribution of a first security application comprised in the first wireless device to a second wireless device, the method comprising:
receiving, using a short distance communication technology, a hardware identifier of the second wireless device; and sending the hardware identifier and information identifying the first security application to a network node, thereby enabling the network node to:
send to the first wireless device a first confirmation that the hardware identifier is received in the network node and/or that it is a correct hardware identifier;
authorise the second wireless device to receive and/or activate a second security application associated with the first security application of the first wireless device; and
send a second confirmation to the first wireless device that the second security application associated with the first security application is authorized in the second wireless device;
send the second security application associated with the first security application of the first wireless device from the network node to the second wireless device;
receiving a first confirmation from the network node that the hardware identifier is received in the network node and/or that it is a correct hardware identifier;
receiving a second confirmation that the second security application associated with the first security application is authorized in the second wireless device;
wherein the first security application and the second security application are both software applications executed by a processor in a secured environment such that, when executed, the first security application and the second security application restrict access to sensitive data;
receiving user input to cancel the authorization to access the second security application, associated with the first security application, in the second wireless device; and
sending instructions to the network node to cancel the authorization to the second wireless device, thereby enabling the network node to cancel the authorization to the second wireless device.

7. The method according to claim 6, comprising:
displaying security applications available for distribution in the first wireless device;
receiving user input on which security application to distribute to the second wireless device, the selected security application is the first security application.

8. The method according to claim 6, wherein the first and second security applications comprises an application for enabling access to external services.

9. The method according to claim 6, wherein the first and second security application comprises a Subscriber Identity Module, SIM.

10. The method according to claim 6, wherein the short distance communication technology is short distance radio technology.

11. The method according to claim 6, wherein the short distance communication technology is Body Coupled Communication, BCC, technology.

12. A method performed in a network node of enabling distribution of a first security application comprised in a first wireless device to a second wireless device, the method comprising:
receiving, from the first wireless device, a hardware identifier of the second wireless device and information identifying the security application;
sending to the first wireless device a first confirmation that the hardware identifier is received in the network node and/or that it is a correct hardware identifier;
authorising the second wireless device to receive and/or activate a second security application associated with a security application of the first wireless device;

sending a second confirmation to the first wireless device that the second security application associated with the first security application is authorized in the second wireless device;

sending the second security application associated with the first security application of the first wireless device to the second wireless device;

wherein the first security application and the second security application are both software applications executed by a processor in a secured environment such that, when executed, the first security application and the second security application restrict access to sensitive data;

receiving instructions from the first wireless device to cancel the authorization to the second wireless device to access the second security application associated with the first security application; and cancelling the authorization to the second wireless device.

13. The method according to claim 12, wherein authorizing comprises requesting authorizing information from a subscription distributing center.

14. The method according to claim 13, wherein authorizing comprises that the network node communicates with an external server.

15. The method according to claim 14, wherein the external server is a service provider server such as a Mobile Network Operator, MNO, server, a server provided by a bank, a server provided by a car manufacturer or a server from an application software company.

16. The method according to claim 12 comprising:
sending the second security application associated with the first security application of the first wireless device, to the second wireless device.

17. The method according to claim 12, wherein the first and second security application comprises an application for enabling access to external services.

18. The method according to claim 12, wherein the first and second security application comprises a Subscriber Identity Module, SIM received from a SIM server.

19. The method according to claim 18, wherein the sending comprises pushing SIM to the second wireless device using SMS or another connectivity protocol.

20. A method, performed in a second wireless device, of enabling distribution of a first security application comprised in a first wireless device to the second wireless device, the method comprising:
receiving, using a short distance communication technology, information identifying the first security application of the first wireless device; and
sending a hardware identifier of the second wireless device and information identifying the first security application to a network node, thereby enabling the network node to:
send to the first wireless device a first confirmation that the hardware identifier is received in the network node and/or that it is a correct hardware identifier;
authorise the second wireless device to receive and/or activate a second security application associated with the first security application of the first wireless device
send a second confirmation to the first wireless device that the second security application associated with the first security application is authorized in the second wireless device;
send the second security application associated with the first security application of the first wireless device from the network node to the second wireless device wherein the first security application and the second security application are both software applications executed by a processor in a secured environment such that, when executed, the first security application and the second security application restrict access to sensitive data.

21. A system, comprising a first wireless device, a second wireless device and a network node, for enabling distribution of a first security application comprised in the first wireless device to the second wireless device, comprising:
the first wireless device, comprising:
communication circuitry for short distance communication;
processing circuitry configured to:
i. receive, using the communication circuitry, a hardware identifier of the second wireless device;
ii. send, using the communication circuitry, the hardware identifier and information identifying the security application to a network node, thereby enabling the network node to authorise the second wireless device to get access to a second security application associated with the security application of the first wireless device;
iii. receive a first confirmation from the network node that the hardware identifier is received in the network node and/or that it is a correct hardware identifier;
iv. receive a second confirmation that the second security application associated with the first security application is authorized in the second wireless device;
v. receive user input to cancel the authorization to access the second security application, associated with the first security application, in the second wireless device; and
vi. send, using the communication circuitry, instructions to the network node to cancel the authorization to the second wireless device; and
the network node, comprising:
communication circuitry for short distance communication;
processing circuitry configured to:
i. receive, using the communication circuitry, from the first wireless device, a hardware identifier of the second wireless device and information identifying the security application;
ii. send to the first wireless device a first confirmation that the hardware identifier is received in the network node and/or that it is a correct hardware identifier;
iii. authorise the second wireless device to access a security application associated with a second security application of the first wireless device;
iv. send a second confirmation to the first wireless device that the second security application associated with the first security application is authorized in the second wireless device; and
v. send the second security application associated with the first security application of the first wireless device from the network node to the second wireless device;
vi. receive instructions from the first wireless device to cancel the authorization to the second wireless device to access the second security application associated with the first security application;
vii. cancel the authorization to the second wireless device;
the second wireless device;

wherein the first security application and the second security application are both software applications executed by a processor in a secured environment such that, when executed, the first security application and the second security application restrict access to sensitive data.

22. The system according to claim 21, wherein the first security application is associated with a particular subscription and activating the second security application associates the second security application with the particular subscription.

23. A first wireless device, for enabling distribution of a first security application comprised in the first wireless device to a second wireless device, comprising:
communication circuitry for short distance communication;
processing circuitry configured to:
receive, using the communication circuitry, a hardware identifier of the second wireless device;
send, using the communication circuitry, the hardware identifier and information identifying the security application to a network node, thereby enabling the network node to:
send to the first wireless device a first confirmation that the hardware identifier is received in the network node and/or that it is a correct hardware identifier;
authorise the second wireless device to get access to a second security application associated with the security application of the first wireless device; and
send a second confirmation to the first wireless device that the second security application associated with the first security application is authorized in the second wireless device;
send the second security application associated with the first security application of the first wireless device from the network node to the second wireless device;
receive a first confirmation from the network node that the hardware identifier is received in the network node and/or that it is a correct hardware identifier;
receive a second confirmation that the second security application associated with the first security application is authorized in the second wireless device;
receive user input to cancel the authorization to access the second security application, associated with the first security application, in the second wireless device; and
send, using the communication circuitry, instructions to the network node to cancel the authorization to the second wireless device;
wherein the first security application and the second security application are both software applications executed by a processor in a secured environment such that, when executed, the first security application and the second security application restrict access to sensitive data.

24. The first wireless device according to claim 23, wherein the first and second security application comprises an application for enabling access to external services.

25. The first wireless device according to claim 23, wherein the first and second security application comprises a Subscriber Identity Module, SIM.

26. The first wireless device according to claim 23, wherein the short distance communication technology is short distance radio technology.

27. The first wireless device according to claim 23, wherein the short distance communication technology is Body Coupled Communication, BCC, technology.

28. A network node, for enabling distribution of a first security application comprised in a first wireless device to a second wireless device, comprising:
communication circuitry for short distance communication;
processing circuitry configured to:
receive, using the communication circuitry, from the first wireless device, a hardware identifier of the second wireless device and information identifying the security application;
send to the first wireless device a first confirmation that the hardware identifier is received in the network node and/or that it is a correct hardware identifier;
authorise the second wireless device to access a security application associated with a second security application of the first wireless device;
send a second confirmation to the first wireless device that the second security application associated with the first security application is authorized in the second wireless device;
send the second security application associated with the first security application of the first wireless device from the network node to the second wireless device;
receive instructions from the first wireless device to cancel the authorization to the second wireless device to access the second security application associated with the first security application;
cancel the authorization to the second wireless device;
wherein the first security application and the second security application are both software applications executed by a processor in a secured environment such that, when executed, the first security application and the second security application restrict access to sensitive data.

29. The network node according to claim 28, wherein the first and second security application comprises an application for enabling access to external services.

30. The network node according to claim 28, wherein the first and second security application comprises a Subscriber Identity Module, SIM received from a SIM server.

31. The network node according to claim 30, wherein the sending comprises pushing SIM to the second wireless device using SMS or another connectivity protocol.

32. The network node according to claim 28, wherein the first security application is associated with a particular subscription and activating the second security application associates the second security application with the particular subscription.

33. A second wireless device, for enabling distribution of a first security application comprised in a first wireless device to the second wireless device, comprising:
communication circuitry for short distance communication;
processing circuitry configured to:
receive, using a short distance communication technology, information identifying the first security application of the first wireless device; and
send a hardware identifier of the second wireless device and information identifying the first security application to a network node, thereby enabling the network node to
send to the first wireless device a first confirmation that the hardware identifier is received in the network node and/or that it is a correct hardware identifier;

authorise the second wireless device to receive and/or activate a second security application associated with the first security application of the first wireless device; and send a second confirmation to the first wireless device that the second security application associated with the first security application is authorized in the second wireless device;

send the second security application associated with the first security application of the first wireless device from the network node to the second wireless device wherein the first security application and the second security application are both software applications executed by a processor in a secured environment such that, when executed, the first security application and the second security application restrict access to sensitive data.

* * * * *